(12) United States Patent
Flaherty et al.

(10) Patent No.: US 7,956,114 B2
(45) Date of Patent: Jun. 7, 2011

(54) WATER IMMISCIBLE ROSIN MILDLY ACTIVATED FLUX

(75) Inventors: Luke M. Flaherty, Long Beach, CA (US); Randal E. Knar, Westminster, CA (US); Tiffanie T. Masumoto, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 10 days.

(21) Appl. No.: 12/381,276

(22) Filed: Mar. 9, 2009

(65) Prior Publication Data

US 2010/0224673 A1    Sep. 9, 2010

(51) Int. Cl.
*B23K 31/02*    (2006.01)
*C09D 9/04*    (2006.01)

(52) U.S. Cl. ......... 524/270; 228/205; 228/207; 228/223
(58) Field of Classification Search ........... 524/270; 228/179.1, 207, 223, 205
See application file for complete search history.

(56) References Cited

U.S. PATENT DOCUMENTS

| | | | |
|---|---|---|---|
| 3,575,738 A | 4/1971 | Becker | |
| 3,762,965 A | 10/1973 | Amin et al. | |
| 3,915,729 A | 10/1975 | Eustice | |
| 3,963,529 A | 6/1976 | Tsunashima | |
| 4,000,016 A | 12/1976 | Lazzarini et al. | |
| 4,290,824 A | 9/1981 | Cole | |
| 4,441,938 A | 4/1984 | Poliak et al. | |
| 4,948,032 A * | 8/1990 | Dunaway et al. | 228/223 |
| 4,994,119 A | 2/1991 | Gutierrez et al. | |
| 5,009,724 A | 4/1991 | Dodd et al. | |
| 5,064,482 A | 11/1991 | Goobich et al. | |
| 5,141,568 A | 8/1992 | Turner et al. | |
| 5,176,749 A | 1/1993 | Costello et al. | |
| 5,176,759 A * | 1/1993 | Taguchi | 148/24 |
| 5,211,763 A | 5/1993 | Takemoto et al. | |
| 5,452,840 A | 9/1995 | Turner | |
| 5,549,761 A | 8/1996 | Winston et al. | |
| 5,938,856 A | 8/1999 | Sachdev et al. | |
| 6,599,372 B2 | 7/2003 | Arora et al. | |
| 6,800,141 B2 | 10/2004 | Sachdev et al. | |
| 2005/0023328 A1* | 2/2005 | Stipp et al. | 228/207 |
| 2007/0102481 A1* | 5/2007 | Kato et al. | 228/101 |
| 2007/0186997 A1 | 8/2007 | Ikeda et al. | |
| 2008/0053571 A1 | 3/2008 | Yamamoto et al. | |
| 2008/0053572 A1 | 3/2008 | Sanji et al. | |

* cited by examiner

*Primary Examiner* — Ling-Siu Choi
(74) *Attorney, Agent, or Firm* — Christie, Parker & Hale, LLP (57) ABSTRACT

Embodiments of the present invention are directed to modified rosin mildly activated (RMA) fluxes and methods of soldering components on printed circuit boards. The modified RMA flux includes a RMA flux material and a randomizing additive. The randomizing additive causes misalignment of the hydrogen bonds between terpine polymer chains created from the RMA flux material during soldering. The resulting modified RMA flux performs as well as, or better than traditional RMA fluxes, but the flux residue remaining after soldering can be removed with a highly polar solvent, such as soapy water.

8 Claims, 10 Drawing Sheets
(10 of 10 Drawing Sheet(s) Filed in Color)

WATER IMMISCIBLE ROSIN MILDLY ACTIVATED FLUX

FIELD OF THE INVENTION

The invention is directed to water immiscible rosin mildly activated (RMA) fluxes, and to methods cleaning the fluxes from electronic components. More particularly, the invention is directed to modified RMA fluxes that can be cleaned from electronic components using a highly polar solvent.

BACKGROUND OF THE INVENTION

Printed circuit boards are used in a wide variety of electronic devices, including computers and communications equipment, among other applications. The printed circuit boards are assembled by soldering components to conductive contacts on the board. The soldering may be accomplished by a number of different techniques, but serves to attach and electrically connect the components and conductive contacts to the board. Prior to soldering, however, a flux is usually applied to the surfaces intended to be joined. The flux chemically prepares the surfaces to receive the solder by removing and preventing the formation of stannous and stannic oxides on the surfaces. This promotes wetting and continuity of the solder at the interface with the circuit, thereby improving the quality and integrity of the electrical and mechanical connections between the adjoining surfaces.

After soldering the fluxed surfaces, and the assembly is cooled, the solder hardens and residual flux polymerizes to form deposits on the exposed surfaces. If allowed to remain on the printed circuit board, the residual flux can cause circuit failure due to stress corrosion resulting from exposure to temperature and humidity. In extreme cases, the flux residue can cause joint fatigue/cracking as there exists a coefficient of thermal expansion (CTE) mismatch between the flux polymer and the metal of the solder joint. Accordingly, the residual flux must be cleaned from the board.

Fluxes useful in electronics applications include rosin fluxes and water soluble fluxes. While rosin fluxes have been more traditionally employed, water soluble fluxes have gained interest due to their lower volatility and compliance with environmental requirements that are becoming ever more stringent. However, water soluble fluxes are much more corrosive than rosin fluxes, making them a less desirable flux for electronics applications. In particular, although water soluble fluxes may be removed with water, if they are not properly cleaned, the residual flux will degrade the treated electronic device. Specifically, the residual flux is chemically active, hydroscopic in nature, and will cause corrosion and etching of the metals, including the very electronic components that it was employed to help solder. The residual flux from water soluble fluxes puts long-term hardware performance at risk, negatively affects the performance of diode junctions, and makes costly field failures likely. Accordingly, rosin fluxes continue to be widely used in electronics applications.

One traditional category of rosin fluxes is rosin mildly activated (RMA) fluxes, which are water resistant. Because RMA fluxes are water resistant, their removal requires the use of organic solvents such as freon, trichloroethane, trichloroethylene, toluene, and isopropyl alcohol. However, in light of environmental restrictions which are becoming more stringent, removing RMA fluxes has become a daunting task. While discovering low volatile organic compound (VOC) cleaning chemicals has proved difficult, one proposed method of cleaning such fluxes includes "bomb proof" closed-loop systems for containing the VOCs resulting from the use of organic solvents. Although these "bomb proof" systems enable compliance with environmental regulations, they are very costly, requiring substantial investments in facility upgrades and new equipment.

In addition, RMA fluxes are stored in an isopropyl alcohol carrier. Because the isopropyl alcohol carrier evaporates rapidly when exposed to air, the pot life of traditional RMA fluxes has historically been limited.

SUMMARY OF THE INVENTION

In one embodiment of the present invention, a modified rosin mildly activated (RMA) flux includes a RMA flux material and a randomizing additive. The RMA flux material may be any such material known in the art, including but not limited to RMA flux materials available from AlphaMetals, Inc. (Jersey City, N.J.). The randomizing additive may be any additive that cause misalignment of the hydrogen bonds between terpine polymer chains created from the RMA flux material during soldering. Nonlimiting examples of suitable randomizing additive include hydrocarbon oils, naturally occurring oils, glycols, and mixtures thereof. The randomizing additive may be present in the modified RMA flux in a concentration ranging from about 3% to about 45%. The resulting modified RMA flux performs as well as, or better than traditional RMA fluxes, but the flux residue remaining after soldering can be removed with a highly polar solvent, such as soapy water.

According to another embodiment of the present invention, a method of soldering components on a printed circuit board includes mixing a RMA flux material with a randomizing additive to form a modified RMA flux, applying the modified RMA flux to the printed circuit board, soldering at least two components of the circuit board, and removing the modified RMA flux using a polar solvent. The polar solvent may be any saponifying media, such as soapy water. For example, the polar solvent may include an aqueous amine solution in deionized water. The method may further include repeating flux application and removal. In addition, the method may further include cleaning the circuit board in a polar solvent heated to about 70 to about 80° C. In addition, the method may further include rinsing the circuit board in deionized water heated to about 80 to about 90° C., and drying the circuit board at a temperature ranging of about 80° C.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other features and advantages of the present invention will be better understood by reference to the following detailed description when considered in conjunction with the accompanying drawings, wherein.

DETAILED DESCRIPTION OF THE INVENTION

In some embodiments of the present invention, a modified rosin mildly activated (RMA) flux is water immiscible and effectively removed with a polar solvent, such as soapy water. The modified RMA flux according to embodiments of the present invention has the properties of traditional RMA fluxes, such as inactivity until heated to soldering temperatures, good cleaning action (once good metal joints are formed during soldering), and inert residue if the geometries of the electronic part do not allow for ease of cleaning. However, in contrast to traditional RMA fluxes, which require organic solvents having high levels of volatile organic compounds (VOCs) to remove the flux residue, the residue from the modified RMA fluxes according to embodiments of the present invention can be cleaned with a polar solvent, such as soapy water. In addition to enabling use of flux residue cleaning mechanisms that comply with stringent environmental regulations, the modified RMA fluxes according to embodiments of the present invention result in reductions in the cost of materials and increased efficiency as compared to current organic solvent cleaning chemicals, which require larger amounts of solvent and drastic measures to comply with strict environmental standards. Comparatively, a soapy water solution from a concentration of about 7 to about 14% has shown substantially complete removal of this water-immiscible RMA flux.

In one exemplary embodiment, the modified RMA flux includes a RMA flux material and a randomizing additive. The RMA flux material may be any suitable RMA flux material known in the art. Nonlimiting examples of suitable flux materials include Alpha Metals Superior 611 (RMA) from AlphaMetals, Inc. (Jersey City, N.J.), Flux 185 (RMA) from Kester Inc., Flux 197 (RMA) from Kester Inc., #5RMA soldering flux (Indium Corporation, Clinton, N.Y.), KR-19 RMA soldering flux (Nihon-Almit, Tokyo, Japan), and RMA flux 202-25 from AIM. In one embodiment, for example, the RMA flux material may be any such flux material obtained from AlphaMetals, Inc., including but not limited to Alpha® 611.

The randomizing additive serves to modify the RMA flux material into a water immiscible product. As used herein, "water immiscible" means that the flux residue is from about 1 to about 5% absorptive, and can be removed by a polar solvent or soaping agent, for example soapy water or any other saponifying media. An understanding of the mechanism by which the modification takes place can be furthered by understanding why the RMA flux material (without the additive) is water resistant. During soldering, the RMA flux material is converted into long chain terpine-based polymers, as shown in Formula 1, below.

A single, basic carbon polymer chain

Formula 1

Separate terpine-based polymer chains are attracted to and bonded to each other through hydrogen bonds that form between oxygen atoms of one chain and hydrogen atoms to another chain. The resulting structure is represented by Formula 2, below, in which the hydrogen bonds are depicted by dashed lines between the oxygen and hydrogen atoms.

Hydrogen bonding of two basic polymer chains

Formula 2

As shown in Formula 2, the linked polymer chains form a dense compound due to the inter-chain hydrogen bonding of the long polymer chains. When multiple layers of polymer chains are stacked, the compact/linear nature of the linked chains effectively renders the cured RMA matrix water resistant because water molecules are incapable of penetrating the densely linked structure. Accordingly, the traditional method of removing the flux residue has been the use of organic solvents, which can penetrate the stacked polymer layers to break the long terpine polymer chains into shorter segments and solvate the hydrogen bonds. However, the best method to solvate these polymer chains requires the use of solvents having high VOC levels. As environmental standards become stricter, the traditional method of removing flux residue becomes increasingly onerous. In particular, special equipment must be used to recapture the VOCs, and increased labor costs result from new procedures and record keeping requirements to remain EPA and AQMD compliant.

In embodiments of the present invention, however, the randomizing additive is believed to interrupt the polymerization process during soldering, thereby creating shorter polymer chains and discontinuous hydrogen bonds in longer polymer chains. Though the change in polymer chain length is not great enough to affect the performance of the material as a soldering flux, used in this case as an oxygen barrier, the shorter chain length results in misalignments in the polymer structure during inter-chain hydrogen bonding. These misalignments create gaps along the paired chain matrix, as shown in Formula 3, below.

Formula 3

The gaps created in the linked polymer chain allow molecules of polar solvents (such as water molecules in soapy water) to interrupt the hydrogen bonds and solvate the cured modified RMA flux residue within the gaps of the long misaligned chain, similar to the non-polar/hydrocarbon solvents used to solvate hydrogen bonds as previously discussed. The resulting soapy organic slurry can be removed by mechanical blotting with a cloth or by a water rinse.

The modified RMA fluxes according to embodiments of the present invention not only meet long-term hardware durability requirements, but also result in environmentally acceptable waste products. In addition, depending on the saponifying agent used, the waste slurry may be biodegradable.

In addition, the modified RMA fluxes according to embodiments of the present invention can be more effectively cleaned from the substrate compared to traditional RMA fluxes. Highly polar solvents, such as soapy water, can dissolve the flux residue even under components where flux residues can usually hide.

The randomizing additive may be any material capable of causing misalignments in the linked polymer chain. Nonlimiting examples of suitable randomizing additives include hydrocarbon oils, naturally occurring oils, glycols, and combinations thereof. Specifically, some nonlimiting examples of suitable hydrocarbon oils include castor bean oil, corn oil, grape seed oil, olive oil, peanut oil, soybean oil, sunflower seed oil, walnut oil, avocado oil, flax seed oil and combinations thereof. Also, some nonlimiting examples of suitable naturally occurring oils include glycerin, jojoba, hemp oil, lanolin, tea tree oil, wheat germ oil, and combinations thereof. In addition, some nonlimiting examples of suitable glycols include benzo-alkyl diols, polyethylene glycols, ethylene adipates, and combinations thereof. In one exemplary embodiment, the randomizing additive is grape seed oil.

In some embodiments, a single randomizing additive may be used in the modified RMA flux. In other embodiments, however, combinations of at least two additives may be used. For example, a combination of two or more additives from the same group may be used, such as two or more hydrocarbon oils. Alternatively, two or more additives from different groups may be used, such as one hydrocarbon oil and one naturally occurring oil, or one oil and one glycerol. When the combination of additives includes two materials from the same group (e.g., two hydrocarbon oils), any mixing ratio may be used. When the combination of additives includes at least two materials from different groups, any mixing ratio may also be used. However, in one embodiment, when the combination includes a mixture of oils (either hydrocarbon or naturally occurring) and glycerols, the weight ratio of oil to glycerol ranges from about 5 to about 20% glycerol in oil. Longer chain oils (i.e., those having higher molecular weight) are less effective at randomizing the terpine polymer, while branched chain hydrocarbons are less effective than linear hydrocarbons. Ratios of glycerol to oil greater than about 20% glycerol in oil negatively affect the performance of the randomizing flux compared to using the hydrocarbon oil by itself.

The randomizing additive is present in the modified RMA flux in a concentration ranging from about 3 wt % to about 45 wt %. In one embodiment, when a smaller chain oil is used, the randomizing additive may be present in an amount ranging from about 7 to about 15 wt %. However, longer chain oils (such as castor oil) require higher concentrations of the oil in the flux media to produce the randomizing effect. When the concentration of the additive is less than about 3 wt %, the chain length of the resulting terpine-based polymers is not shortened enough to cause sufficient misalignment in the linked polymer chain, and the polar solvent is therefore not sufficiently capable of penetrating the linked chain. Also, at concentrations greater than about 45 wt %, the randomizing additive prevents formation of a solid polymer. When this occurs, the liquid may slough off the forming solder joint, allowing tin oxides to form. In particular, as higher concentrations of randomizing additives are used with a basic RMA flux, the concentration of the flux activating agents decrease. For example, at 50 percent dilution, the resident RMA flux activator would be at half its concentration. Accordingly, the modified flux works best at higher dilutions. However, at some higher dilutions, flux activators, such as adipic acid or caproic acid, would need be added to compensate for the loss occurring as a result of the dilution. Additionally, the higher concentrations of randomizing agents result in minimization of the polymer effect, causing the flux to "thin out" at reflow. Therefore, according to embodiments of the present invention, the randomizing additive is present in the modified RMA flux in a concentration ranging from about 3 to about 45 wt %.

Although the compatibility of the randomizing additive with the RMA flux material may vary depending on the selected additive and RMA flux material, and the compatibility of the additive and flux material may affect long-term effectiveness. However, any combination or permutation of randomizing additives included in an amount within the specified range effectively renders the heat-treated modified RMA flux water immiscible and removable with a polar solvent or soaping agent.

According to another embodiment of the present invention, a method of soldering components on a printed circuit board includes mixing a RMA flux material with a randomizing additive to form a modified RMA flux, applying the modified RMA flux to at least one component of the printed circuit board, soldering at least two components of the circuit board, and removing the modified RMA flux using a polar solvent. The polar solvent may be any polar solvent or a saponifying media, such as soapy water. Other nonlimiting examples of suitable polar solvents include AlphaMetals Armaclean 2000, Reactive Aqueous Defluxing Systems (RADS—sodium bicarbonate and hydrogen peroxide in water), Zestron Atron AC 200 and Atron 300. In one exemplary embodiment, the polar solvent may include an aqueous amine solution in deionized water. One nonlimiting example of a suitable aqueous amine solution is Aquanox® 4615US (available from Kyzen Corporation, Nashville, Tenn.). The aqueous amine solution may be present in an amount of about 3 wt % or greater. For example, the aqueous amine solution may be present in an amount ranging from about 7 to about 30 wt %. In one embodiment, for example, the aqueous amine solution is present in a concentration of about 12 wt %.

The method may further include repeating flux application and removal, which may be repeated as many times as desired. In addition, the method may further include cleaning the circuit board in a polar solvent heated to about 70 to about 80° C. In one embodiment, for example, the polar solvent is a 12 wt % aqueous amine solution (such as Aquanox® 4615US) in deionized water. The method may further include rinsing the circuit board in deionized water heated to about 80 to about 90° C., and drying the circuit board at a temperature of about 80° C.

In one exemplary embodiment, a method of soldering components on a printed circuit board includes preparing a modified RMA flux by mixing 10 wt % of a randomizing additive (e.g., grape seed oil) in 90 wt % of a RMA flux material. The modified RMA flux is applied on the substrate of a printed circuit board, and the desired components are soldered to the substrate. The modified RMA flux is then removed using a soaping solution or polar solvent, such as a 12 wt % aqueous amine solution (such as Aquanox® 4615US) in deionized water. The application and removal of the modified RMA flux may be repeated as many times as desired. The printed circuit board is then cleaned in a polar solvent or soaping solution (such as a 12 wt % aqueous amine solution in deionized water) heated to a temperature ranging from about 70 to about 80° C. The printed circuit board is then rinsed in deionized water heated to a temperature ranging from about 80 to about 90° C., and the printed circuit board is then dried at a temperature of about 80° C.

The following Examples are presented for illustrative purposes only, and do not limit the scope of the present invention.

EXAMPLE 1

Figure 1:
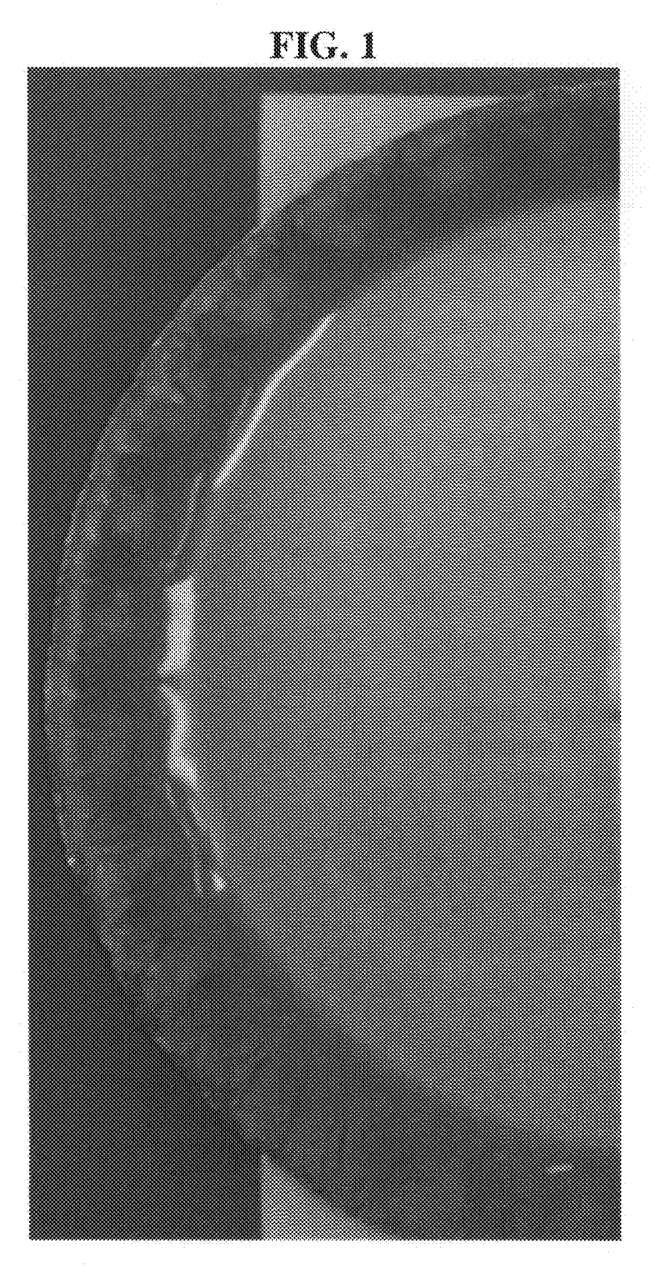
FIG. 1 is a picture of a modified RMA flux according to one embodiment of the present invention, where the modified RMA flux was exposed to air for two hours.

Depicted in FIG. 1

A modified RMA flux was prepared by mixing 1 gram of grape seed oil in 9 grams of Alpha 611 (a standard RMA flux available from Alpha Metals, Inc.; Jersey City, N.J.). The modified RMA flux was applied on the substrate of a printed circuit board, and components were soldered to the substrate. The modified RMA flux was then removed using a 12 wt % aqueous amine solution (Aquanox® 4615US available from Kyzen Corp.; Nashville, Tenn.) in deionized water.

COMPARATIVE EXAMPLE 1

Figure 2:
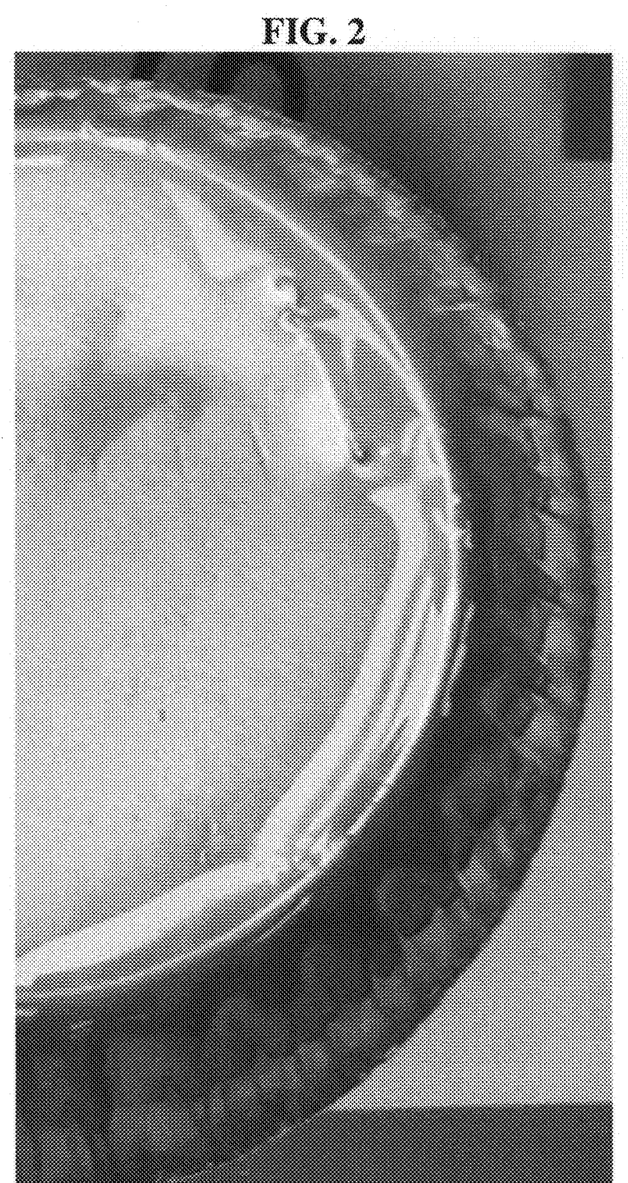
FIG. 2 is a picture of a RMA flux according to the prior art, where the traditional RMA flux was exposed to air for two hours.

Depicted in FIG. 2

Alpha 611 was used to solder desired components to the substrate of the circuit board, as in Example 1. The Alpha 611 was then removed using the same method as in Example 1.

Equal amounts of the fluxes of prepared as in Example 1 and Comparative Example 1 were placed in separate containers and exposed to air for two hours. FIG. 1 depicts the modified RMA flux of Example 1 after exposure to air, and shows that the modified RMA flux according to Example 1 remains in the liquid state after exposure to air. FIG. 2 depicts the standard RMA flux of Comparative Example 1, and shows that the standard RMA flux of Comparative Example 1 is completely dried after exposure to air. Accordingly, FIGS. 1 and 2 demonstrate that standard RMA fluxes quickly evaporate when exposed to air, while the modified RMA flux of Example 1 has a significantly greater pot life.

Figure 3:
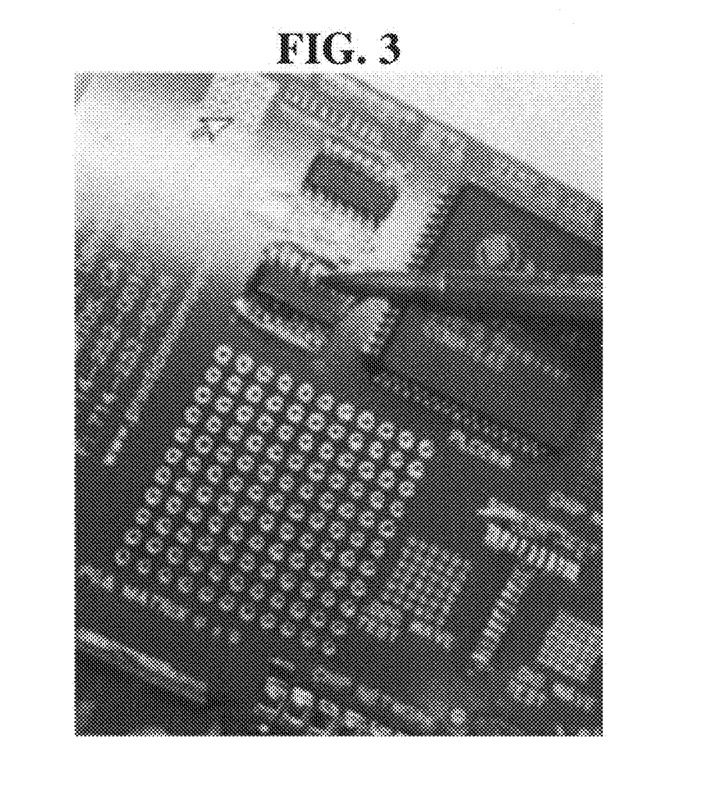
FIG. 3 is a picture showing a component being soldered onto the substrate of a circuit board using a modified RMA flux according to one embodiment of the present invention.
Figure 4:
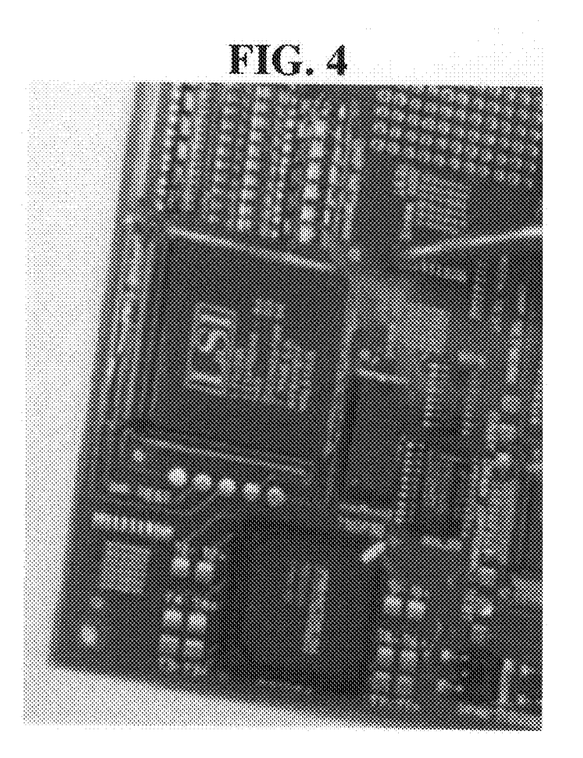
FIG. 4 is a picture showing a component being soldered onto the substrate of a circuit board using a RMA flux according to the prior art.

FIG. 3 depicts a component being soldered to a circuit board using a the modified RMA flux of Example 1. FIG. 4 depicts a component being soldered to a circuit board using the standard RMA flux of Comparative Example 1. As shown in FIGS. 3 and 4, the modified RMA flux of Example 1 produces little, if any, soldering fumes compared to the traditional RMA flux of Comparative Example 1.

Figure 5:
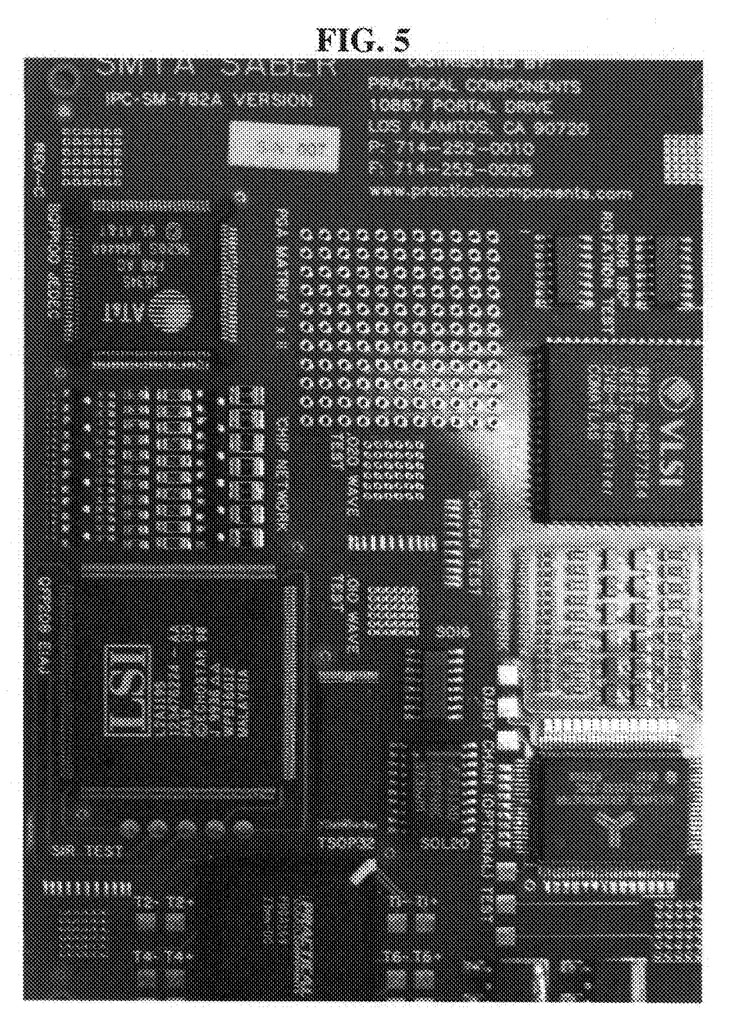
FIG. 5 is a picture of a cleaned circuit board which had been soldered using a modified RMA flux according to one embodiment of the present invention.
Figure 6:
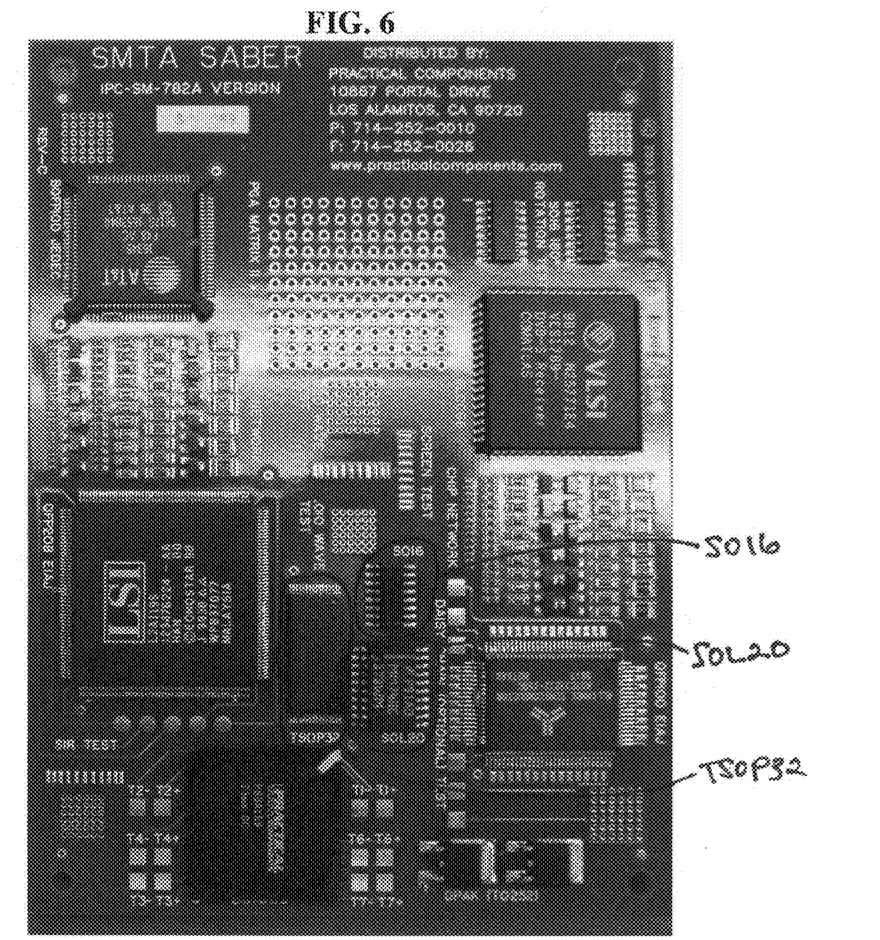
FIG. 6 is a picture of a cleaned circuit board which had been soldered using a traditional RMA flux.

FIG. 5 depicts a circuit board that has been cleaned after soldering using the modified RMA flux of Example 1. FIG. 6 depicts a circuit board that has been cleaned after soldering using the standard RMA flux of Comparative Example 1. FIG. 6 depicts a circuit board that has been cleaned after soldering using the standard RMA flux of Comparative Example 1. After cleaning, the circuit boards were tested for contamination using an Ionic Contamination Test System (available from Aqueous Technologies; Rancho Cucamonga, Calif.). As shown in FIG. 5, the modified RMA flux of Example 1 showed a total contamination of 1.1 µg. As shown in FIG. 6, the standard RMA flux of Comparative Example 1 showed a total contamination of 224.6 µg. Accordingly, as shown in FIGS. 5 and 6, the circuit board soldered using the modified RMA flux of Example 1 was over 100 times cleaner after soldering and cleaning than the circuit board soldered using the standard RMA flux of Comparative Example 1. The flux residue is visually depicted in FIG. 6 as the white haze directly to the left of component SO16 and in between components CO16 and SOL20. In addition, more flux residue is visually depicted as a triangle on the bottom right corner of component TSOP32.

Figure 7:
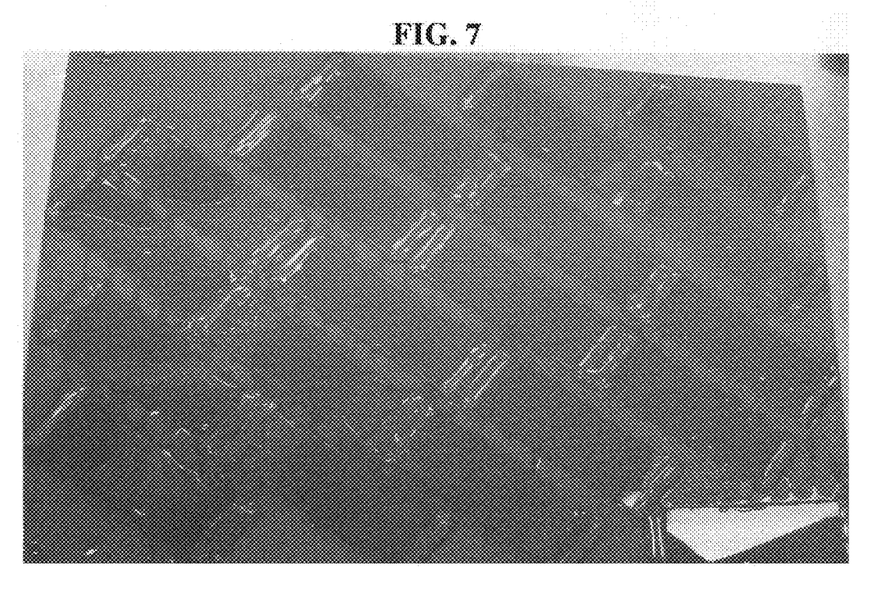
FIG. 7 is a picture of a modified RMA flux according to one embodiment of the present invention applied on glass slides.
Figure 8:
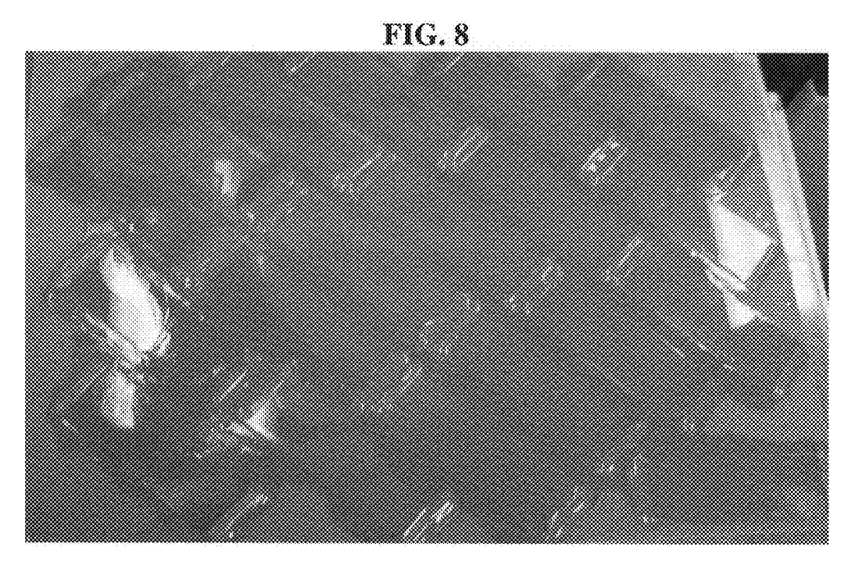
FIG. 8 is a picture of a RMA flux according to the prior art applied on glass slides.
Figure 9:
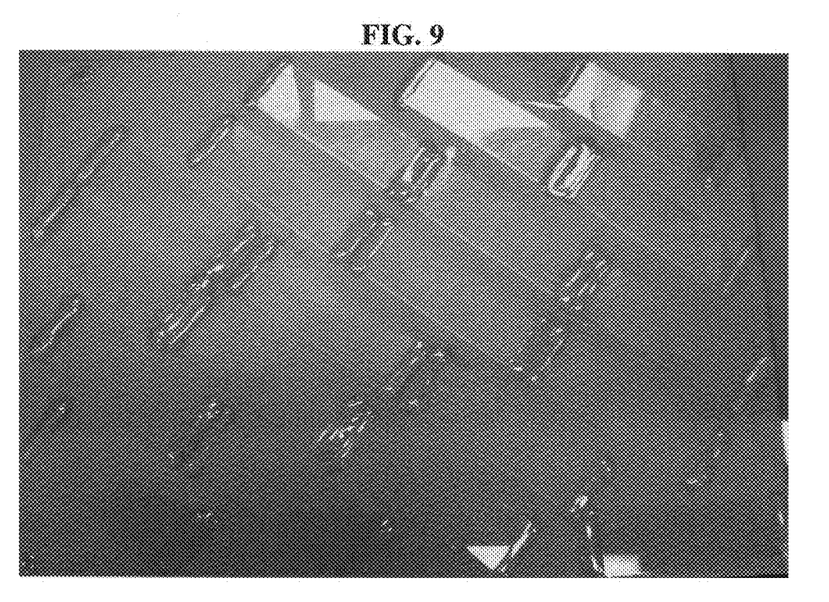
FIG. 9 is a picture of the glass slides of FIG. 7 after cleaning.
Figure 10:
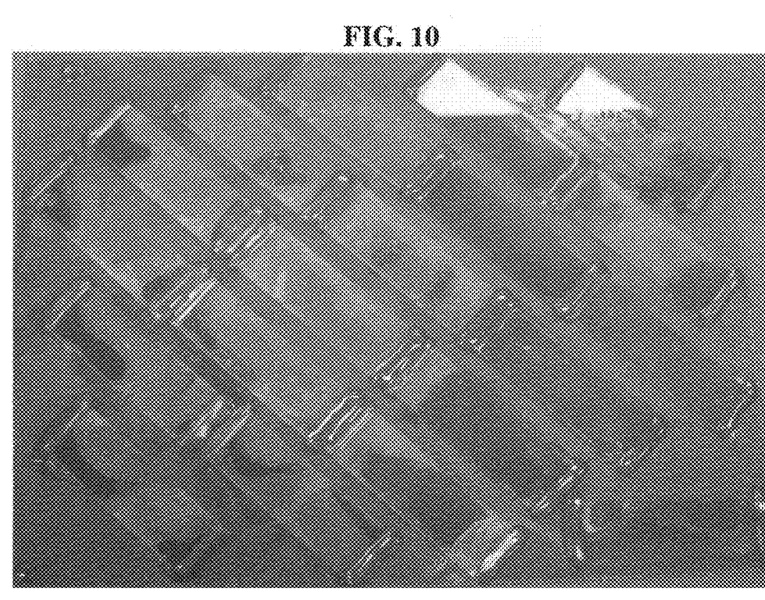
FIG. 10 is a picture of the glass slides of FIG. 8 after cleaning.

The modified RMA flux of Example 1 was then applied to glass slides, as depicted in FIG. 7. Similarly, the standard RMA flux of Comparative Example 1 was applied to glass slides, as depicted in FIG. 8. The glass slides were then cleaned. FIG. 9 depicts the glass slides of FIG. 7 after cleaning, and FIG. 10 depicts the glass slides of FIG. 8 after cleaning. As shown in FIGS. 9 and 10, the slides depicted in FIG. 9 are significantly cleaner than those depicted in FIG. 10. In addition, the stand-off distances (i.e., the distance between the bottom of the slides and the substrate to which they were mounted) vary from right to left between about 0.002" and 0.030." The modified RMA flux (as compared to the standard RMA flux) allows soapy water cleaning methods to remove a majority of processed flux contained in the stand-off area regardless of the stand-off area height variation. This is depicted in FIGS. 7 and 9 (modified RMA flux) as compared to FIGS. 8 and 10 (standard RMA flux).

Like traditional RMA fluxes, the modified RMA fluxes according to embodiments of the present invention are compatible with many different soldering media and can be incorporated into flux pastes and screen printed. However, the modified RMA fluxes according to embodiments of the present invention contain fewer volatile species than traditional RMA fluxes. Traditional RMA fluxes use isopropyl alcohol as a carrier, but this carrier evaporates quickly when exposed to air, thereby limiting the pot life of the flux. In contrast, the modified RMA fluxes according to embodiments of the present invention use non-volatile additives, produce fewer soldering fumes during processing, exhibit substantially less out-gassing (fume production) upon exposure to heat, have longer pot lives once exposed to air (e.g., in some embodiments, the modified RMA fluxes have pot lives exceeding 2 hours), and are nearly 100 times cleaner after soldering and cleaning than traditional RMA fluxes.

In addition, the modified RMA fluxes according to embodiments of the present invention effect dramatic reductions in cost and significant increases in productivity and efficiency. Given the recent tightening of environmental standards, bringing the traditional RMA flux process into environmental compliance will require significant equipment and process changes having a drastic economic impact as compared to the changes required to implement a process using the modified RMA fluxes according to embodiments of the present invention. Considering aspects such as facility upgrades, material costs, and labor costs, implementing a process for the use of the modified RMA fluxes according to embodiments of the present invention will be substantially less costly than implementation of a process to continue use of standard RMA fluxes.

The modified RMA fluxes according to embodiments of the present invention would require facility enhancements including procuring a deionized water supply, installing plumbing to carry the deionized water from the source, and ensuring adequate drainage for the deionized water and soap slurry. For a facility with a capacity of about 300 units/month, the approximate cost of installing plumbing for the deionized water is $10,000, and the approximate costs of the drain and related pipeline is $20,000. To bring a similar facility using traditional RMA fluxes into environmental compliance would require a far greater capital investment. For instance, such a facility would require a scrubber unit costing approximately $350,000, as well as installation and ducting changes costing approximately $150,000. As seen by this comparison, the costs associated with changing from traditional RMA fluxes to the modified RMA fluxes according to embodiments of the present invention represent only 6% of the costs associated with bringing traditional RMA flux facilities into environmental compliance. Accordingly, for a 330 unit/month facility, changing from traditional RMA fluxes to the modified RMA fluxes according to embodiments of the present invention represents a capital investment savings of $440,000.

The modified RMA fluxes according to embodiments of the present invention also present far lower recurring material costs. In particular, a suitable liquid soap for use in the modified RMA fluxes according to embodiments of the present invention costs about $60/gallon, and deionized water costs about $0.25/gallon. A 10% soap solution is generally sufficient for cleaning purposes, and would cost about $6.23/gallon (i.e., 10% liquid soap costs $6, and 90% deionized water costs $0.23). In a facility with a capacity of 300 units/month, about 18 gallons/week of the soap solution would be required, yielding a weekly material cost of $112.14. In contrast, due to the lower efficiency of the cleaning solution, traditional RMA fluxes require at least double the amount of cleaning solution (with respect to the current amount of 13 gallons/week). The traditional RMA flux cleaning solutions cost about $180/gallon, and assuming that twice as much solution is needed to clean the same number of units (i.e., 26 gallons/week), the weekly material cost for traditional RMA flux facilities is $4680. As seen from this comparison, the weekly material cost of modified RMA facilities represents only about 2.4% of the material cost of traditional RMA flux facilities. Accordingly, changing from traditional RMA fluxes to modified RMA fluxes according to embodiments of the present invention represents a weekly material cost savings of $4567.86, or a yearly cost savings of $228,393 based on a 50 week year.

In addition, the modified RMA fluxes according to embodiments of the present invention enable significant reductions in recurring labor costs. Facilities using traditional RMA fluxes require additional steps in the manufacture of printed circuit boards. In particular, additional labor is required for loading and unloading the units into the "bomb-proof" closed-loop system, as well as for the increased documentation requirements associated with VOC use. The total labor time per board using traditional RMA fluxes is about 25.5 minutes, whereas the total labor time per board using modified RMA fluxes according to embodiments of the present invention is about 16.2 minutes. As seen from this comparison, the labor time associated with the use of modified RMA fluxes according to embodiments of the present invention represents only 64% of the labor time associated with the use of traditional RMA fluxes. Assuming a fully burdened labor rate of $90/hour and a monthly output of 300 boards-per-month, facilities using traditional RMA fluxes incur a monthly labor cost of $11,475, and a yearly labor cost of $137,700. In contrast, facilities using modified RMA fluxes according to embodiments of the present invention incur a monthly labor cost of $7,290, and a yearly labor cost of $87,480, representing a monthly savings of $4,185 and a yearly savings of $50,220. Accordingly, the use of modified RMA fluxes according to embodiments of the present invention represents about a 36% decrease in labor costs as compared to the use of traditional RMA fluxes.

As seen from the above cost comparisons, changing from the use of traditional RMA fluxes to modified RMA fluxes according to embodiments of the present invention results in dramatic reductions in operation and production costs. In particular, accounting for savings in facilities upgrades, materials, and labor, changing from traditional RMA fluxes to the modified RMA fluxes according to embodiments of the present invention in a 300 unit/month facility results in a total savings per facility in the first year of about $718,613, and a total savings per facility over five years of about $1,833,065.

While the present invention has been illustrated and described with reference to certain exemplary embodiments, those of ordinary skill in the art will understand that various modifications and changes may be made to the described embodiments without departing from the spirit and scope of the present invention, as defined in the following claims.

What is claimed is:

1. A modified rosin mildly activated flux comprising a rosin mildly activated (RMA) flux material and a randomizing additive, wherein the modified rosin mildly activated flux is capable of being cleaned using an aqueous solution, and the randomizing additive is selected from the group consisting of castor bean oil, corn oil, grape seed oil, olive oil, soybean oil, sunflower seed oil, walnut oil, avocado oil, flax seed oil, glycerin, jojoba, hemp oil, lanolin, tea tree oil, wheat germ oil, benzo-alkyl diols, ethylene adipates, and combinations thereof.

2. The modified rosin mildly activated flux according to claim 1, wherein the randomizing additive is grape seed oil.

3. The modified rosin mildly activated flux according to claim 1, wherein the randomizing additive is present in an amount ranging from about 3 to about 45 wt %.

4. The modified rosin mildly activated flux according to claim 1, wherein the randomizing additive is present in an amount of about 10 wt %.

5. The modified rosin mildly activated flux according to claim 1, wherein at soldering temperatures, the RMA flux material transforms into chains of terpine-based polymers, and wherein the randomizing additive is configured to interrupt hydrogen bonding between the chains of the terpine-based polymers.

6. A method of soldering components on a printed circuit board, the method comprising:

applying the modified rosin mildly activated flux according to claim 1 on a substrate of the printed circuit board;

soldering at least one component to the substrate of the printed circuit board; and removing the modified rosin mildly activated flux from the printed circuit board using a polar solvent.

7. The method according to claim 6, further comprising:

after removing the modified rosin mildly activated flux from the printed circuit board, cleaning the printed circuit board in the polar solvent heated to a temperature ranging from about 71 to about 80° C.

8. The method according to claim 6, further comprising:

after removing the modified rosin mildly activated flux from the printed circuit board, rinsing the printed circuit board in ionized water heated to a temperature ranging from about 80 to about 90° C., and drying the circuit board.

* * * * *